US012800551B2

(12) United States Patent
Hughes et al.

(10) Patent No.: US 12,800,551 B2
(45) Date of Patent: Nov. 17, 2026

(54) TAMPER PREVENTION FOR AN ULTRASOUND TRANSDUCER

(71) Applicant: Novosound Ltd., Newhouse (GB)

(72) Inventors: David Hughes, Newhouse (GB); Claire Brigid Thring, Newhouse (GB); Daniel Irving, Newhouse (GB); Heather Trodden, Newhouse (GB)

(73) Assignee: Novosound Ltd., Newhouse (GB)

( * ) Notice: Subject to any disclaimer, the term of this patent is extended or adjusted under 35 U.S.C. 154(b) by 535 days.

(21) Appl. No.: 18/038,312

(22) PCT Filed: Nov. 24, 2021

(86) PCT No.: PCT/GB2021/053051
§ 371 (c)(1),
(2) Date: May 23, 2023

(87) PCT Pub. No.: WO2022/112761
PCT Pub. Date: Jun. 2, 2022

(65) Prior Publication Data

US 2024/0003853 A1 Jan. 4, 2024

(30) Foreign Application Priority Data

Nov. 24, 2020 (GB) ...................................... 2018464

(51) Int. Cl.
*G01N 29/24* (2006.01)
*G01B 17/00* (2006.01)
(Continued)

(52) U.S. Cl.
CPC ......... *G01N 29/2437* (2013.01); *G01B 17/00* (2013.01); *G01H 11/08* (2013.01);
(Continued)

(58) Field of Classification Search
CPC .... G01H 11/08; G01N 29/04; G01N 29/2437; G01N 29/223; G01N 2291/023; G01N 2291/101; G01B 17/00
(Continued)

(56) References Cited

U.S. PATENT DOCUMENTS 3,737,690 A * 6/1973 Antonio ............. G08B 13/1618
310/322
4,359,903 A 11/1982 Crutzen et al.
(Continued)

FOREIGN PATENT DOCUMENTS

CN 101297591 A * 10/2008 ............... H04R 1/32
CN 107992931 A 5/2018
(Continued)

OTHER PUBLICATIONS

International Serch Report and Written Opinion, Application No. PCT/GB2021/053051, Dated Oct. 3, 2022.
(Continued)

*Primary Examiner* — Peter J Macchiarolo
*Assistant Examiner* — Monica S Young
(74) *Attorney, Agent, or Firm* — Patterson + Sheridan, LLP

(57) ABSTRACT

An ultrasonic sensor comprising an ultrasonic transducer, the ultrasonic transducer comprising: a piezoelectric element; and an active electrode and a counter electrode adapted for electrical connection to the piezoelectric element; wherein the piezoelectric element, the active electrode and the counter electrode are comprised in at least part of an electrical circuit for operating the piezoelectric element; the ultrasonic sensor is mounted or configured to be mountable to an entity to be sensed; and the ultrasonic sensor is adapted such that removal of the ultrasonic sensor from the entity
(Continued)

causes a breaking of an electrical circuit so as to render the ultrasonic sensor inoperable or irreversibly inoperable.

20 Claims, 9 Drawing Sheets

(51) Int. Cl.
*G01H 11/08* (2006.01)
*G01N 29/04* (2006.01)
*G01N 29/22* (2006.01)

(52) U.S. Cl.
CPC ........... *G01N 29/04* (2013.01); *G01N 29/223* (2013.01); *G01N 2291/023* (2013.01); *G01N 2291/101* (2013.01)

(58) Field of Classification Search
USPC .......................................................... 73/629
See application file for complete search history.

(56) References Cited

U.S. PATENT DOCUMENTS

| | | | | |
|---|---|---|---|---|
| 5,646,470 | A | 7/1997 | de Groot | |
| 6,421,013 | B1 * | 7/2002 | Chung | H01Q 1/2225 235/441 |
| 7,814,652 | B2 * | 10/2010 | Bellew | G01N 29/022 29/830 |
| 9,881,880 | B2 | 1/2018 | Busby et al. | |
| 2004/0113524 | A1 * | 6/2004 | Baumgartner | B06B 1/0685 310/328 |
| 2005/0200241 | A1 * | 9/2005 | Degertekin | B06B 1/0292 310/334 |
| 2009/0157358 | A1 * | 6/2009 | Kim | G01M 11/085 702/185 |
| 2010/0013574 | A1 * | 1/2010 | Huang | B81B 3/0027 333/186 |
| 2010/0032478 | A1 | 2/2010 | Deng | |
| 2011/0090658 | A1 * | 4/2011 | Adams | H10W 42/40 427/7 |
| 2011/0170108 | A1 * | 7/2011 | Degertekin | G01Q 60/38 356/454 |
| 2012/0218867 | A1 * | 8/2012 | Kandori | G01N 29/2412 367/95 |
| 2016/0107194 | A1 * | 4/2016 | Panchawagh | B06B 1/0644 310/317 |
| 2017/0116830 | A1 * | 4/2017 | Isaacs | G08B 13/128 |
| 2017/0319180 | A1 * | 11/2017 | Henneken | A61B 8/12 |
| 2018/0325491 | A1 * | 11/2018 | Pekar | B06B 1/0292 |
| 2018/0350757 | A1 * | 12/2018 | Busby | H05K 1/0306 |
| 2018/0358311 | A1 * | 12/2018 | Busby | H01L 24/83 |
| 2018/0374471 | A1 * | 12/2018 | Dirksen | B06B 1/0292 |
| 2019/0321007 | A1 * | 10/2019 | Hakkens | A61B 8/4455 |
| 2020/0015784 | A1 * | 1/2020 | Loebl | H01H 59/0009 |
| 2020/0246829 | A1 * | 8/2020 | Hakkens | B06B 1/0292 |
| 2020/0413202 | A1 * | 12/2020 | Kusano | H04R 31/00 |
| 2021/0055153 | A1 * | 2/2021 | Forster-Knight | G01M 3/28 |
| 2022/0196169 | A1 * | 6/2022 | Chua | B63B 22/18 |
| 2024/0036005 | A1 * | 2/2024 | Lal | B06B 1/0622 |

FOREIGN PATENT DOCUMENTS

| | | | | | |
|---|---|---|---|---|---|
| CN | 109069107 | A | | 12/2018 | |
| CN | 104581592 | B | * | 1/2019 | H04R 25/606 |
| EP | 1273998 | A1 | * | 1/2003 | H05K 1/0275 |
| GB | 1402530 | A | | 8/1975 | |
| GB | 2300508 | A | * | 11/1996 | G08B 13/1409 |
| JP | 2014090515 | A | * | 5/2014 | |

OTHER PUBLICATIONS

Great Britian Search Report, Application No. GB2018464.4, dated May 21, 2021.
Chinese Office Action for Application No. 202180078847.X dated May 6, 2026.

* cited by examiner

TAMPER PREVENTION FOR AN ULTRASOUND TRANSDUCER

FIELD

The present disclosure relates to ultrasonic and other piezoelectric devices and associated methods of use and production.

BACKGROUND

Ultrasound techniques are widely used in fields of imaging and measurement. Such ultrasound techniques utilize mechanical pressure waves, with frequencies beyond the limit of human hearing (above 20 kHz) and ranging up to many GHz. These waves can propagate through solids, liquids and gases, causing interactions such as scattering, reflection and attenuation. It is these interactions that are useful for non-destructive testing and medical imaging.

In both use cases, an ultrasound detector is used to measure the amplitude and time of arrival of mechanical waves incident on its receiving surface. In many cases, an ultrasound source is also used to emit the mechanical waves as well, most commonly in the same transducer (providing a single sensor for transmission and reception).

Ultrasound is a standard tool for industrial non-destructive testing markets. Here, an ultrasound transducer may send mechanical waves in a frequency range from 0.1 MHz to 20 MHz into a solid object and then convert the reflected mechanical waves into a measurable signal for the detection of defects, corrosion, erosion or other mechanical structures in the object. This is carried out repeatedly to build up an image of the structure, or indeed over time to monitor the health or status of the object.

In industrial markets such as power, energy production, oil and gas, renewables or aerospace, the health or status of an object is measured to detect and monitor signs of corrosion, erosion, cracks, and other defects. Development of these defects may happen over a long time and at a very slow rate (perhaps as low as 0.1 μm per day). This requires a very stable sensor in the measurement tool, providing a measurement signal that only deviates due to the changes in the object under inspection and not due to other external factors.

SUMMARY

Among the goals set out herein is to provide an ultrasonic sensor that is particularly beneficial for demanding applications, such as but not limited to industrial non-destructive testing. Such as sensor has to overcome a range of challenges.

If the sensor has been disturbed (i.e. moved, altered, or damaged), but the data logger/collector is unaware and continues to collect data, this may alter the trend or predictive nature of the data, reducing accuracy. The invention disclosed here addresses this problem because once the sensor is fitted to the object it cannot be physically disturbed, either deliberately or inadvertently, without stopping its function. This makes it a robust tamperproof sensor for the long-term monitoring of an object, and any disturbance to the sensor will show up as a cessation of data to the trendline rather than populating it with negative data.

For the effective prediction and management of corrosion and erosion, accuracy is dependent on stable measurements at each time point. Errors such as those from sensor angle, position, or user variation, reduce this accuracy. Non-flat objects pose a particular challenge when connecting a sensor face and object surface for efficient transfer of sound energy. In practice, variations in the angle of the sensor face relative to the object affects the direction of sound propagation, giving rise to large amounts of operator error. The invention disclosed here solves that with a flexible assembly that conforms to the object, removing these systemic errors and variations.

Other key challenges also exist in the non-destructive testing or monitoring of objects, such as pipes, piping, pipelines, vessels, tanks, and other metallic and non-metallic structures that are not flat. Often these objects are operating at a high temperature or in hard to reach locations. Indeed, a combination of all these situations pose a challenge for conventional ultrasound sensors which the invention disclosed here solves.

Traditional ultrasound sensors lose their efficiency at high temperatures and therefore long-term exposure to objects at elevated temperatures (from 0 to 600° C.) is infeasible for non-destructive testing. This is due to the materials used to convert electrical energy to mechanical energy, such as ceramics and polymers. Ceramic materials lose their piezoelectric efficiency above their curie temperature, and polymers lose their efficiency through de-poling or physically melting at around 100° C. The invention disclosed here solves this problem through being assembled with a non-ceramic or non-polymer sensor element.

Finally, in hard to reach locations, either due to restricted movement, hazardous environmental materials or elevated environmental temperatures, it can be difficult to do manned inspections wherein an engineer is sent with test equipment, perhaps with rope access or tight crawl space, to carry out the work during normal operating conditions. This places limits and conditions on the time available to carry out the measurements and compounds the operator error if repeated measurements are taken weeks or months apart, due in part to the aforementioned challenges of angular variation of the sound path. The invention disclosed here solves this problem by being permanently installed to the object, allowing measurements to be collected autonomously over long periods of time, inside harsh environments, without movement or relocation of the sensor.

This latter point means that the traceability and reliability of the sensor measurement is fixed at install, removing the challenge of repeat calibrations or operator error due to subsequent measurements.

Thus, the invention disclosed here solves all of the aforementioned challenges as an assembly of a tamperproof ultrasound sensor for the continuous, permanently installed, monitoring of both flat and complex shaped objects across a large temperature range.

According to a first aspect of the present disclosure is an ultrasonic sensor comprising an ultrasonic transducer, the ultrasonic transducer comprising:

a piezoelectric element; and an active electrode and a counter electrode adapted for electrical connection to the piezoelectric element; wherein the piezoelectric element, the active electrode and the counter electrode are comprised in at least part of an electrical circuit for operating the piezoelectric element;

the ultrasonic sensor is mounted or configured to be mountable to an entity to be sensed; and the ultrasonic sensor is adapted such that removal of the ultrasonic sensor from the entity causes a breaking of an electrical circuit so as to render the ultrasonic sensor inoperable, e.g. irreversibly inoperable.

The ultrasonic sensor may further comprise an active electrode conductor and a counter electrode conductor adapted for electrical conduction with the active electrode and counter electrode respectively. The active electrode conductor and counter electrode conductor may also be comprised in at last part of the electrical circuit.

The ultrasonic sensor may be configured such that release of a compressive force on at least part of the ultrasonic sensor causes the breaking of the electrical circuit. The ultrasonic sensor may be configured such that removal of the ultrasonic sensor from the entity releases the compressive force.

The ultrasonic transducer may comprise at least one frangible component. The frangible component may be configured to fragment responsive to the compressive force. The ultrasonic transducer may be configured such that the frangible component being fragmented and/or the release of the compressive force causes or results in the circuit being broken so as to render the ultrasonic sensor inoperable. The ultrasonic transducer may be configured such that a combination of the frangible component being fragmented and the release of the compressive force causes or results in the circuit being broken so as to render the ultrasonic sensor inoperable.

The frangible component may be or comprise a ceramic component, such as a ceramic tube, e.g. a soft cured ceramic tube. The frangible component may be, comprise or be comprised in a sacrificial layer, which may be designed to fracture on installation of the ultrasonic sensor on the entity. The frangible component may be, comprise or be comprised in a cylinder, tube or other hollow body.

The frangible component may be, comprise or be comprised in at least one or each of: the piezoelectric element, the active electrode, the counter electrode, the active electrode conductor and/or the counter electrode conductor. The frangible component may be a separate component to at least one or each of: the piezoelectric element, the active electrode, the counter electrode, the active electrode conductor and/or the counter electrode conductor.

The frangible component may a configured, such that when in an unfragmented state, the frangible component acts on at least one or each of: the piezoelectric element, the active electrode, the counter electrode, the active electrode conductor and/or the counter electrode conductor to put it into a condition where it forms at least part of the electrical circuit or can be utilized to form at least part of the electrical circuit. The frangible component may a configured, such that when fragmented, the frangible component releases at least one or each of: the piezoelectric element, the active electrode, the counter electrode, the active electrode conductor and/or the counter electrode conductor. The ultrasonic sensor may be configured such that when the frangible component is fragmented and the compressive force has been released, then at least part of the electrical circuit is free to move or caused to move into a configuration where the circuit is broken and/or the ultrasonic sensor is inoperable, e.g. permanently inoperable.

The ultrasonic transducer may comprise a housing. At least one or each of: the piezoelectric element, the active electrode, the counter electrode, the active electrode conductor, the counter electrode conductor and/or the frangible component may be located within the housing. The frangible component, at least in the unfragmented state, may act and/or extend between the housing and at least one or each of: the piezoelectric element, the active electrode, the counter electrode, the active electrode conductor, the counter electrode conductor and/or the frangible component, e.g. to hold them in a position where they form at least part of the electrical circuit or can be utilized to form at least part of the electrical circuit. The frangible component may a configured, such that when fragmented, the frangible component no longer holds and/or is incapable of holding at least one or each of: the piezoelectric element, the active electrode, the counter electrode, the active electrode conductor, the counter electrode conductor and/or the frangible component, e.g. in a position where they form at least part of the electrical circuit or can be utilized to form at least part of the electrical circuit.

The ultrasonic device may comprise or be configured to receive an urging mechanism. The urging mechanism may be configured to apply the compressive force to at least part of the ultrasonic transducer. The urging mechanism may be operable to selectively apply and/or selectively release the compressive force. The urging mechanism may be configured to maintain the compressive force once applied, at least until it is selectively released. The compressive force may be directly or indirectly applied to at least one or each of: the piezoelectric element, the active electrode, the counter electrode, the active electrode conductor, the counter electrode conductor and/or the frangible component. The urging mechanism may comprise an urging mechanism, for urging at least the ultrasonic transducer toward the entity in use. The urging mechanism may be or comprise a screw threaded member, which may be screwable into the housing so as to selectively apply the compressive force and/or may be screwable out of the housing so as to release the compressive force. However, it will be appreciated that the urging mechanism may be or comprise one or more other force applying mechanisms such as a lever, one or more toothed cogs, a cam member, an electromagnet, a piston, a syringe, a quick release, a bolt, a friction fit member, and/or the like.

The ultrasonic sensor may comprise a mount for mounting the ultrasonic sensor to the entity. The mount may be or comprise the urging mechanism. That is, the ultrasonic sensor may be configured such that the compressive force is applied to the at least part of the ultrasonic transducer when the ultrasonic sensor is mounted to the entity using the mount and/or during the process of mounting the ultrasonic sensor to the entity using the mount.

The mount may comprise or be configured to attach to a band, strap or clamp adapted for securing to the entity. The band or strap may be metal. The band or strap may be formed from a conformable material or comprise a conformable portion. The band or strap may be elastomeric. The band or strap may be resiliently stretchable. The band or strap may not be stretchable and/or may be non-extensible. The mount may comprise a securer for securing the band or strap in position on the entity, such as a ratchet, a clamp, a clasp, a pin and hole arrangement, screw, worm drive, or the like. Beneficially, the mount may be or comprise an adhesive-less mount that can mount the ultrasonic sensor without adhesives. The ultrasonic sensor may be configured for mounting without welding or other permanent installation method. In this way, the ultrasonic sensor may be more reliably mounted to the entity in use.

However, alternatively, the mount may comprise an adhesive for adhering to the entity, which may be acceptable in certain applications. The adhesive and optionally at least part of the electrical circuit, e.g. at least part of at least one or each of: the piezoelectric element, the active electrode, the counter electrode, the active electrode conductor and/or the counter electrode conductor may remain adhered to the entity and detach from the ultrasonic sensor.

The ultrasonic device may be configured to operate with the compressive force in the range from 10 to 100 MPa. The compressive force may be applied during installation, e.g. during mounting of the ultrasonic sensor to the entity. The compressive force may be applied, e.g. continuously applied, during operation of the ultrasonic sensor, e.g. in use.

The entity may be or comprise a pipe, a support, a beam, a girder, a strut, a sheet or panel, a tube, a conduit, a structural member, and/or the like but are not limited to these. The entity may be an organic entity or living entity. The entity may be a person or other animal. The entity may be a tree, plant or the like. The entity may be a building or other construction. The entity may be or be part of a vehicle, such as a car, aeroplane, ship or boat, train, bus, lorry, van, bike, snowmobile, and/or the like. The entity may be an autonomous or automated entity, such as a drone, robot, autonomous vehicle, or the like.

The ultrasonic sensor may comprise backing material, which may be provided between the urging mechanism and/or the mount and at least one or each of: the piezoelectric element, the active electrode, the counter electrode, the active electrode conductor, the counter electrode conductor, and/or the frangible component. The backing material may be conformable. The backing material may be electrically conductive. The backing material may be or comprise graphite, re-enforced graphite, or other graphite-based materials. The backing material may be compressible or incompressible. The backing material may be configured to convey the compressive force from the urging mechanism or mount to at least one or each of: the piezoelectric element, the active electrode, the counter electrode, the active electrode conductor, the counter electrode conductor, and/or the frangible component.

The ultrasonic transducer may be configured to brought into an operative state, e.g. by the application of the compressive force. For example, at least one or each of: the piezoelectric element, the active electrode, the counter electrode, the active electrode conductor and/or the counter electrode conductor may be in an initial or “as manufactured” state in which the electrical circuit is broken, for example by at least one part of the electrical circuit being spaced apart from at least one other part of the electrical circuit by a gap, such as an air gap. For example, in the initial or “as manufactured” state, at least two of: the piezoelectric element, the active electrode, the counter electrode, the active electrode conductor and/or the counter electrode conductor are spaced apart from each other by the gap. The application of the compressive force may close the gap to thereby close or complete the circuit, which may render the ultrasonic sensor operable upon application of a suitable signal to the active electrode. The at least one or each of: the piezoelectric element, the active electrode, the counter electrode, the active electrode conductor and/or the counter electrode conductor may be held by the frangible member in a configuration in which the circuit is closed or closable, e.g. in which the gap is closable by application of the compressive force. The ultrasonic transducer may be configured such that, when the frangible component is fragmented, the frangible component no longer holds the at least one or each of: the piezoelectric element, the active electrode, the counter electrode, the active electrode conductor and/or the counter electrode conductor in a configuration in which the circuit is closed or closable, e.g. so that the gap may not be closable by application of the compressive force. The ultrasonic transducer may be configured such that the at least one or each of: the piezoelectric element, the active electrode, the counter electrode, the active electrode conductor and/or the counter electrode conductor is configured to move or may be movable out of the configuration in which the circuit is closable when the frangible component is fragmented and the compressive force released.

At least part of the ultrasonic sensor, e.g. the ultrasonic transducer, may be flexible and/or conformable. The ultrasonic transducer may be configured to conform to a range of different geometries, including but not limited to convex, concave, cylindrical and spherical geometries. The ultrasonic transducer may be directly mechanically coupled or couplable to the entity, e.g. without ultrasonic coupling gel, welding or any other bonding to achieve direct ultrasonic transference between the entity and the ultrasonic sensor. This may be achievable by the high degree of conformability and/or flexibility. At least one or each of: the piezoelectric element, the active electrode, the counter electrode, the active electrode conductor and/or the counter electrode conductor may be flexible. The ultrasonic transducer may be a thin film transducer. The ultrasonic transducer may comprise a flexible layer of piezoelectric material on a flexible substrate, such as a metal foil. The piezoelectric element may be or comprise the layer of piezoelectric material. The metal foil may be or comprise or act as one of: the active electrode or the counter electrode. The layer of piezoelectric material may have a thickness in a range of 2 to 20 μm. The substrate may have a thickness in a range from 20 to 200 μm thick. The piezoelectric material may be a doped, co-deposited or alloyed piezoelectric material. The piezoelectric material may comprise: a metal oxide, a metal nitride, a transition metal oxide or nitride, a doped, co-deposited or alloyed metal oxide or metal nitride and/or the like. The metal may be Zinc or Aluminium, e.g. the piezoelectric material me be or comprise ZnO or AlN. The metal oxide or metal nitride may be doped, co-deposited or alloyed with vanadium or a compound thereof; or the piezoelectric material may be zinc oxide doped, co-deposited or alloyed with a transition metal or a compound thereof. The piezoelectric material may be sputter coated onto the substrate or coated onto the substrate, e.g. using sol-gel deposition, e.g. sol-gel piezoceramic deposition. The substrate may comprise aluminium, steel, titanium, brass or other suitable metal. The substrate may be or comprise a foil, sheet or disc.

The piezoelectric material may be a crystalline, e.g. polycrystalline or columnar, piezoelectric material. The piezoelectric material may be non-polymeric or may not be comprised in a polymeric material. The piezoelectric material may be or comprise a continuous layer of material having piezoelectric properties, e.g. the piezoelectric material may not comprise discrete domains of piezoelectric material having piezoelectric properties within a matrix of non-piezoelectric material. The layer of piezoelectric material may be thinner than the substrate, e.g. at least half or at least quarter the thickness of the substrate or thinner than the substrate by an order of magnitude or more.

The ultrasonic sensor may comprise a plurality of ultrasonic transducers, which may be comprised in an ultrasonic transducer array. The ultrasonic transducer array may be patterned on the substrate. Each ultrasonic transducer may have a common counter electrode, e.g. the substrate. Each ultrasonic transducer may have an individual dedicated active electrode or may have a conjoined electrode with at least one other ultrasonic transducer. The active electrode (may also be referred to as a live electrode) for each ultrasonic transducer may be metal, e.g. aluminium, steel, titanium or brass, and may be formed by sputtering, masking and deposition, or other methods.

The housing may be rigid. The housing may be flexible. The housing may be electrically conductive. The housing may be electrically coupled to one of: the active electrode conductor or the counter electrode conductor. The housing may be metal or metallic. The housing may be formed from stainless steel, ceramic, or nickel based conductor.

The ultrasonic transducer may be configured to produce and emit ultrasonic waves, e.g. responsive to a drive signal applied to the active electrode, and/or receive and detect ultrasonic waves, e.g. to receive and detect reflections of the emitted ultrasonic waves. The ultrasonic sensor may be an ultrasonic sensor for imaging, measurement or testing, e.g. non-destructive testing (NDT). The ultrasonic sensor may be a non-destructive testing device. The ultrasonic sensor may be adapted to perform NDT inspections, including, but not limited to, pipe wall thickness measurements, corrosion detection, acoustic emission monitoring, and/or the like. The ultrasonic transducer may be configured to provide an output signal representative of the received ultrasonic waves or one or more properties thereof, e.g. of the amplitude, frequency, wavelength, and/or timing of the ultrasonic waves. The ultrasonic transducer may be configured to emit ultrasonic wave and/or to detect and/or measure received reflections of the ultrasonic waves.

The ultrasonic sensor may comprise a power source, such as a battery, capacitor, inductive power coupling system or other electrochemical, electrostatic or electromagnetic power source. The ultrasonic sensor may be wired or wireless. The ultrasonic sensor may receive power and/or the drive signal and/or may output the output signal via wired or other physical connectors. Alternatively or additionally, the ultrasonic sensor may receive the drive signal and/or provide the output signal wirelessly. The ultrasonic sensor may comprise a wireless communications system for communicating wirelessly with remote and/or separate devices, e.g. to receive the drive signal and/or to send the output signal. The wireless communications system may be configured to communicate using Bluetooth®, ZigBee®, WiFi®, WiMAX®, NFC, a cellular telephone and/or data network or other suitable communications channel or mechanism. Optionally the power for the ultrasonic sensor may be provided wirelessly, e.g. via inductive coupling. The drive signal may be provided by control electronics, which may be onboard the ultrasonic sensor, e.g. housed in the housing, and may be provided using the power source. The ultrasonic sensor may comprise or be configured to access data storage and the ultrasonic sensor may be configured to record the output signal, e.g. over time, in the data storage. The data storage may be on-board, e.g. within the housing and may be powered by the power source. The data storage may be external and/or remote from the ultrasonic sensor, e.g. such that the data is output from the ultrasonic sensor to the data storage, e.g. via wired or wireless communications.

The ultrasonic sensor may be configured to operate above 30° C., e.g. above 50° C. such as above 100° C. The ultrasonic sensor may be configured to operate at temperatures between 30° C. and 500° C., e.g. between 100° C. and 500° C. The ultrasonic sensor may be configured to operate at temperatures below 30° C., e.g. below −10° C., e.g. down to −100° C. The ultrasonic sensor may be configured to operate at temperatures between −200° C. and 400° C., e.g. without the need for coolant, couplant or heating apparatus.

The active electrode conductor and/or the counter electrode conductor may be electrically terminated into a fixture, housing, or device, using techniques including, but not limited to, terminal screws, crimp connections, sprung pin connections, and/or the like. These techniques may facilitate the disposability and interchangeability of the sensor.

The ultrasonic sensor may be configured to be operable in ultrasound frequencies, e.g. from 5 to 70 MHz, and optionally with varied bandwidths. The operable frequency bandwidths may be chosen by the choice of the thickness of the piezoelectric layer, substrate thickness, wear face usage/thickness, and the use of tuneable electrical circuitry. The usage of high frequencies may provide high time base resolution, giving high accuracy thickness measurements According to a second aspect of the present disclosure is a method of constructing and ultrasonic sensor, such as an ultrasonic sensor according to the first aspect. The method may comprise: providing a piezoelectric element and providing an active electrode and a counter electrode connected or adapted for electrical connection to the piezoelectric element. The method may comprise providing an active electrode conductor and a counter electrode conductor connected to, or adapted for electrical conduction with, the active electrode and counter electrode respectively. The method may comprise arranging the piezoelectric element, the active electrode and the counter electrode so that they are comprised in at least part of an electrical circuit for operating the piezoelectric element. The method may comprise configuring the ultrasonic sensor to be mountable to an entity to be sensed. The method may comprise configuring the ultrasonic sensor such that removal of the ultrasonic sensor from the entity causes a breaking of the electrical circuit so as to render the ultrasonic sensor inoperable, e.g. irreversibly inoperable.

The method may comprise providing at least one frangible component. The ultrasonic transducer may comprise providing a housing. The method may comprise locating at least one or each of: the piezoelectric element, the active electrode, the counter electrode, the active electrode conductor, the counter electrode conductor and/or the frangible component within the housing. The method may comprise arranging the frangible component such that, when in an unfragmented state, the frangible component acts between the housing and at least one or each of: the piezoelectric element, the active electrode, the counter electrode, the active electrode conductor and/or the counter electrode conductor to put it into a condition where it forms at least part of the electrical circuit or can be utilized to form at least part of the electrical circuit.

The method may comprise providing and/or arranging any feature identified above in relation to the first aspect.

According to a third aspect of the present disclosure is a method of using the ultrasonic sensor of the first aspect. The method may comprise mounting the ultrasonic sensor on an entity. The method may comprise applying a compressive force to at least part of the ultrasonic sensor, e.g. by operating the urging mechanism. The method may comprise closing the gap by applying the compressive force so as to complete the electrical circuit. The method may comprise applying the compressive force so as to fragment the frangible component. The method may comprise applying an electrical drive signal to the active electrode via the active electrode conductor so as to operate the ultrasonic transducer to produce ultrasonic radiation, e.g. to emit ultrasonic waves into the entity. The method may comprise removing the compressive force, e.g. by operating the urging mechanism and/or by unmounting the ultrasonic sensor from the entity, to thereby break the electrical circuit so as to render the ultrasonic sensor inoperable, e.g. irreversibly inoperable.

Further aspects and optional features of the present disclosure are as follows:

The device comprises of an ultrasound sensor which is designed to only function once installed and which ceases to function irrevocably once uninstalled, thus making it both tamper proof and disposable. The device is designed for compression, which may act as the installation method. The time during which the sensor is operable may be anything from less than a minute to more than a year. It may be installed using a fixture, such as prior art GB2582562A. While installed the sensor may be configured to send and receive ultrasonic signals. This may be utilised for non-destructive testing and monitoring of industrial components or for medical imaging including wearable or portable applications.

The device may compose of a piezoelectric element which may be a thin film, such as prior art GB2571529A, allowing it to conform to a range of surface geometries. It can conform to convex, concave and other complex surfaces, such as, 45 mm and larger outer diameter piping and elbow bends. It may be used in conjunction with multiple other sensors to work like an array.

The sensor geometry and its corresponding active area can be tailored to suit difficult access locations and high spatial precision applications. The usage of different piezoelectric elements may allow for a wide range of operational frequencies, from 20 kHz or lower to in excess of 80 MHz depending on the desired application.

The sensor head materials are designed for compression. This may include an outer frangible layer to facilitate electrical isolation, compressibility, and disposability; this may be composed of a suitable cast ceramic. An electrical contact may be provided to the sensor using a thin sheet metal, which may be, but is not exclusive to, aluminium, steel, titanium, or brass. This may be, but is not exclusive to, 50 μm thickness to allow for conformability and flexibility. Ultrasonic backing may be provided using flexible graphite-based materials, to prevent echoes from the back wall, to damp reverberation, and to protect the sensor from damage during compression. This may be, but is not exclusive to, 2 mm in thickness tanged-steel re-enforced graphite.

Compression of the sensor stack may be used as an installation method, causing the frangible component to break away, creating the electrical connection through to the piezoelectric element, and creating n mechanical bond from the sensor front face into the desired object of inspection to facilitate ultrasonic transmission. The sensor may finally be backed by a ridged cap or housing, on which the compression force is applied to install it. Compression force may be applied via a screw fitting or similar mechanism. The rigid cap may house wiring to allow the electrical connection of the sensor face. Electrics termination of the sensor head may be facilitated with screw terminals, sprung pins or similarly robust connection.

The compressible, mechanical design of this sensor allows for very simple installation, requiring in the range of 10-100 MPa of compression, no coupling fluids, welding, delay lines or waveguides. It is capable of functioning at temperatures of −10 C or lower, and in excess of 600 C because no low temperature adhesives or materials are required in the assembly and installation, and due to the high temperature nature of the prior art thin film that may be used (GB2571529A).

The compressible, mechanical design of this sensor means that the sensor components may fragment into their individual parts once compression has been removed, meaning the sensor cannot be moved, guaranteeing integrity of repeat measurements, and preventing tampering.

According to an example is a tamper proof piezoelectric sensor comprising of: (a) a component for ultrasonic generation and detection; and a mechanical assembly designed for compression such that: (i) the act of installation allows for transduction, (ii) removal from situ it ceases to function and cannot be re-fitted.

The following describe optional features that can be applied to any of the above or below examples or aspects.

The sensor may include a sacrificial layer or layers designed to fracture on installation. This may be, but is not limited to, soft cured ceramic tubing. The disposable nature of the sensor in the above may make it tamper proof and improves the accountability, accuracy, and traceability of the measurement. The sensor of the above may be mechanically assembled such that it does not require adhesives to facilitate the disposable nature. The sensor of the above may be designed to be installed, removed, and/or replaced from a fixture, housing, or device (e.g. previous patent claim) with minimum operator intervention. The sensor of the above may be flexible such that it can conform to a range of geometries. These include, but are not limited to, convex and concave curvatures, cylinders, and spheres. The mechanical assembly of the above sensor may include materials which are electrically conductive materials and are acoustically suited to sensor operation. The sensor of the above may be designed such that it functions at a range of temperatures and harsh environments without the need for coolant or couplant. Sustained operating temperatures may be as low as −200° C. and in excess of 400° C. The sensor of the above may be installed in a fixed location using a band mounted fixture (previous patent claim). Installation does not require welding or other permanent installation methods. The sensor of the above may be electrically terminated into a fixture, housing, or device, using techniques including, but not limited to, terminal screws, crimp connections, or sprung pin connections. These techniques may facilitate the disposability and interchangeability of the sensor. The sensor of the above may utilize a piezoelectric element to generate ultrasound, this may be, but is not limited to, a sputtered ZnO thin film and alternative materials may include doped ZnO, AlN, sol-gel deposited piezoceramics. The piezoelectric element of the above may be, but is not limited to, a sputtered ZnO layer deposited on various substrates such as aluminium, steel, titanium, or brass. The materials of the above may include, but is not limited to graphite, graphite-based materials, or re-enforced graphite. The sensor of the above may be mounted onto or inside a protective casing or cap. This may facilitate electrical termination and mechanical compression. For harsh environments this cap may comprise of stainless steels, ceramics, and nickel-based conductors. The sensor of the above may contain one or many distinct or conjoined live electrodes which may be created by the placement of an arbitrary thin metallic element or elements above the piezoelectric material, designed to be brought into contact under compression. This may be, but is not limited to, aluminium, steel, titanium or brass. The electrode or electrodes may also be created by sputtering or other methods. The sensor of the above may be designed to operate with mechanical compression in the range of 10-100 MPa. Compression may be applied at installation or during operation through the outer housing or fixture of the device. The sensor stack of the above may be mechanically assembled through the use of formed components or component features. This may be achieved through the use of thin sheet materials, such as steel, aluminium, titanium or brass. This method may facilitate assembly without adhesives. The sensor of the above may be coupled mechanically to the desired object of inspection due to its compressible nature, and therefore does not require ultrasonic coupling gel, welding, or any other bonding to achieve ultrasonic signal transference. The sensor of the above may have high spatial resolution due to its ability to utilise small active apertures. The sensor of the above may be capable of generating and detecting a range of ultrasound frequencies (5 to 70 MHz) with varied bandwidths, which may be chosen by the choice of proprietary film thickness, substrate thickness, wear face usage/thickness, and the use of tuneable electrical circuitry. The usage of high frequencies may provide high time base resolution, giving high accuracy thickness measurements. The sensor of the above claims may be installed once, due to its disposable nature, however after installation it can remain in place for any amount of time required or until sensor failure. The sensor design may allow for low profile construction for integration into fixtures, housings or devices. The sensor of the above may be used in conjunction with multiple other sensors with the potential to function like an ultrasonic array. The sensor of the above may be used for NDT inspections, including, but not limited to, pipe wall thickness measurements, corrosion detection, and acoustic emission monitoring. The sensor of the above may be used on inanimate, or animate objects, including organics, with a suitable fixture, housing, or encapsulation.

The individual features and/or combinations of features defined above in accordance with any aspect of the present invention or below in relation to any specific embodiment of the invention may be utilised, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

BRIEF DESCRIPTION OF THE DRAWINGS

For a better understanding of the present disclosure and to show how embodiments may be put into effect, reference is made to the accompanying drawings in which.

DETAILED DESCRIPTION OF THE DRAWINGS

Figure 1:
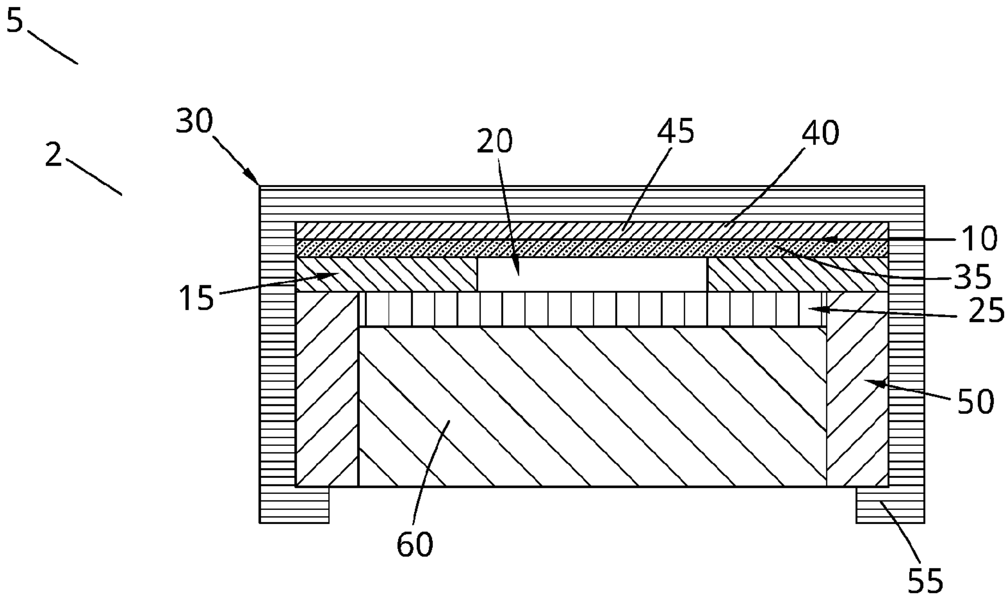
FIG. 1 is a cross sectional view through an ultrasonic transducer of an ultrasonic sensor.

FIG. 1 shows a cross section through an ultrasonic transducer 2 forming part of an ultrasonic sensor 5. The ultrasonic transducer 2 comprises a piezoelectric element 10, an aperture former 15 that defines an air gap 20, and an active electrode 25 that are contained within a housing 30.

The piezoelectric element 10 is a thin film transducer comprising a layer of piezoelectric material 35 that has been deposited, e.g. sputter coated, onto an electrically conductive substrate 40 such as a metallic foil or layer, e.g. an aluminium, steel, titanium or brass foil or layer. The substrate 40 is thicker than the layer of piezoelectric material 35, e.g. by a factor of 2 or 5 or a factor of 10 or 20 or more. The piezoelectric material 35 could be, for example, an inorganic material such as zinc oxide (ZnO) or aluminium nitride (AlN), optionally doped with a transition metal or transition metal compound such as vanadium. The layer of piezoelectric material 35 is beneficially continuous rather than being discrete domains of piezoelectric material in a polymeric matrix. The layer of piezoelectric material could, for example, be polycrystalline and is optionally non-polymeric. In this example, the substrate 40 acts as a counter electrode 45 and is arranged towards the entity to be sensed, in use. This particular piezoelectric element 10 construction is beneficially flexible and conformable and yet is capable of a high level and range of ultrasonic output.

The housing 30 is electrically conductive and could be formed from, for example, a metal or metallic material such as aluminium, steel, titanium, brass or the like. Walls of the housing could be less than 200 μm thick, e.g. 50 μm thick or less. The housing 30 is optional, and in other examples, the piezoelectric element 10 can extend around the other components to serve as the housing. The housing defines an outer wear layer that can accommodate physical abrasions and generally protects the piezoelectric element 10. In some examples, the housing 30 abuts the substrate 40 that acts as the counter electrode 45 such that the housing 30 forms part of an electrical circuit for connecting a signal source to the counter electrode 45.

The aperture former 15 is an optional component. The aperture former 15 is electrically insulating and could be formed from a polymeric or other dielectric material. The aperture former 15 defines one or more apertures that in turn define respective air gaps 20, at least in an initial or "as manufactured" state. The air gaps 20 are removed under application of a compressive force, in use. The number, size and shape of the apertures can be selected depending on the application. Examples of apertures can be seen in FIGS. 2A to 2D. FIG. 2A shows a single aperture. FIG. 2B shows a pair of side by side apertures of equal size. FIG. 2C shows annular concentric apertures of different sizes. FIG. 2D shows multiple arbitrary shaped apertures defining an electrode array.

The active electrode 25 is an electrically conducting, generally metallic layer which could be, for example, aluminium, steel, titanium, bras or the like. The active electrode 25 is, in examples, less than 200 μm thick, e.g. 50 μm thick or less. In this way, the active electrode has a degree of flexibility so as to close the air gap 20 when required.

The active electrode 25 is located within a hollow frangible component 50, at an opening thereof. Whilst the frangible component 50 is intact, it holds the active electrode in place. The frangible component 50 in this example is tubular, but could be different shapes depending on the application. The frangible component 50 is electrically insulating and could be formed from a ceramic material, such as a soft cured ceramic or alternatively could be formed from silicone rubber. The frangible component 50 is configured to sit between the active electrode 50 and the housing 30 (or the piezoelectric element 10 in embodiments without the housing 30) so as to electrically insulate the active electrode 50 from the housing 30. The frangible component 50 is kept in place by being engaged with a lip 55 in the housing 30 and an opposite end of the frangible component 50 engages the aperture former 15 (or the piezoelectric element 10 in examples that don't have the aperture former 15). In this way, when the frangible component 50 is not fragmented, it can also hold the aperture former (if present) and piezoelectric element 10 in place.

In some examples, at least one or each of: the piezoelectric element 10, the aperture former 15 and the active electrode 25 are loosely placed inside the housing 30 and are held in place by the frangible component 50, at least in an initial or "as manufactured" state of the transducer assembly 65. That is, the frangible component 50 bears between the lip 55 and the aperture former or piezoelectric element 10, and contains the active electrode 25, in order to hold the active electrode 25, piezoelectric element 10, and aperture former 15 in place against the housing 30, in the initial or "as manufactured" state.

The interior of the frangible component 50 behind the active electrode 25 comprises or is filled by a backing material 60. The backing material 60 is preferably electrically conductive to facilitate electrical connection of a signal source to the active electrode 25. The backing material 60 is optionally conformable. Examples of suitable backing materials include graphite, re-enforced graphite, or other graphite-based or carbon containing materials.

The ultrasonic sensor 5 could optionally contain only one ultrasonic transducer 2, or two or more ultrasonic transducers 5 in an array or stack.

Figure 3:
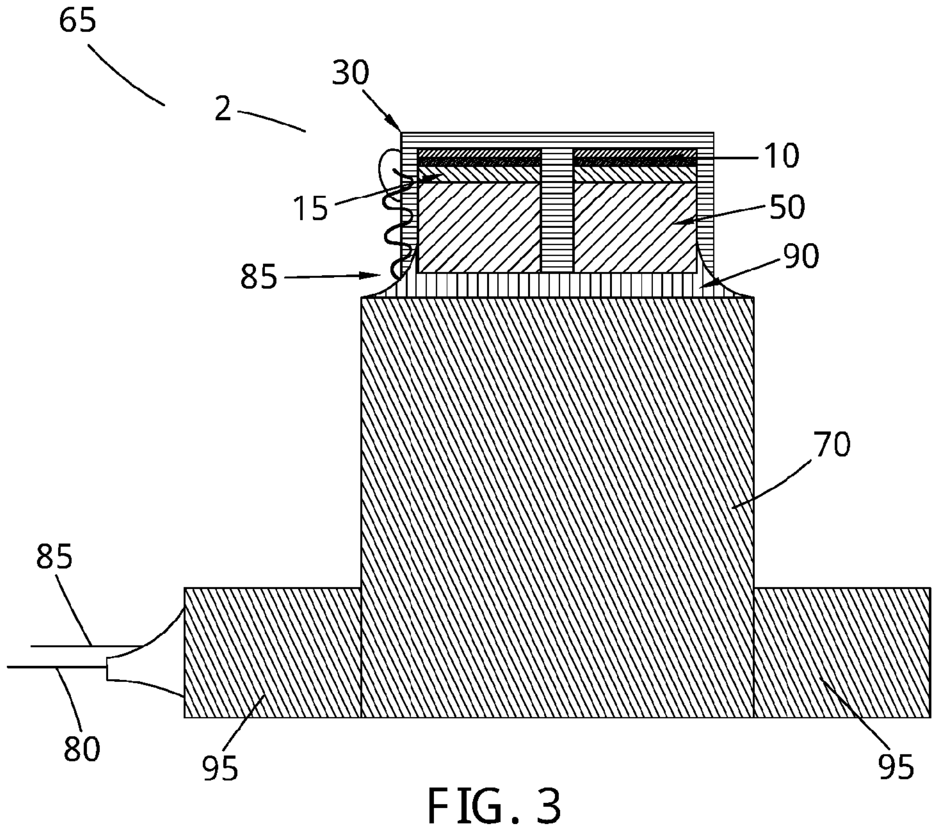
FIG. 3 is a side view of a transducer assembly comprising the ultrasonic transducer of FIG. 1.
Figure 4:
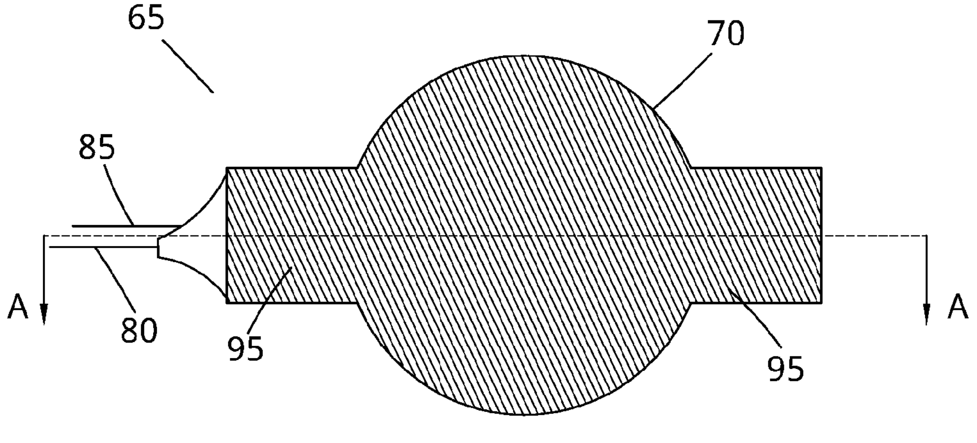
FIG. 4 is a bottom end view of the part of the transducer assembly shown in FIG. 3.
Figure 5:
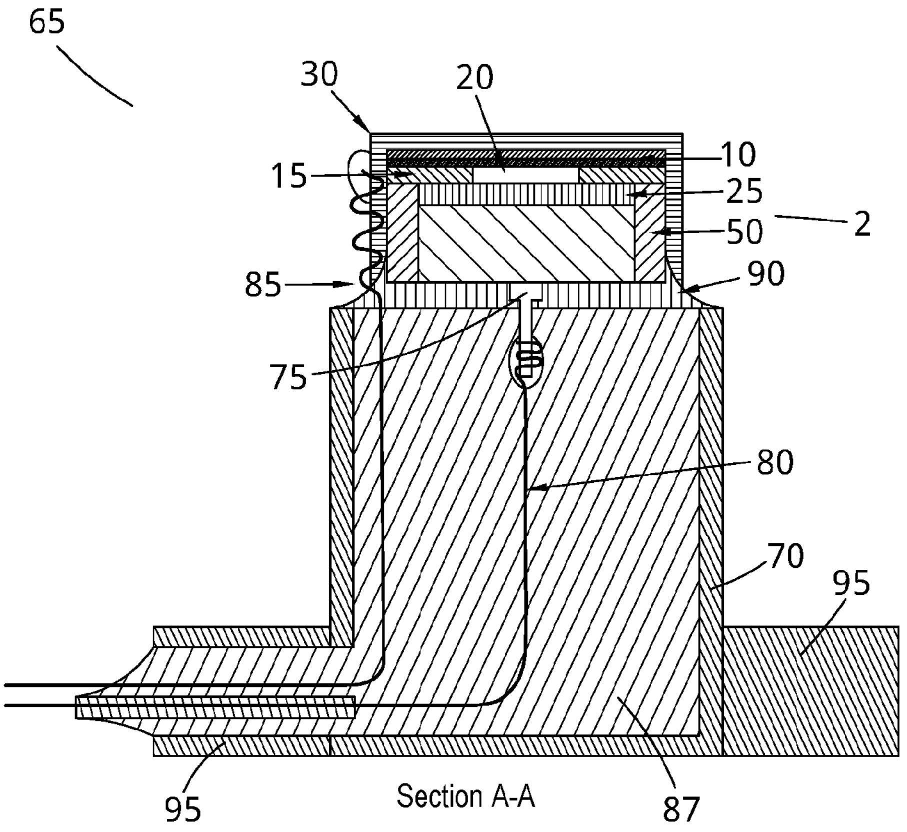
FIG. 5 is a side cross sectional view through part of the transducer assembly shown in FIG. 3, taken through the section A-A shown in FIG. 4.

FIGS. 3 to 5 show an ultrasonic transducer assembly 65 comprising the ultrasonic transducer 2 and a sensor cap 70. FIG. 3 provides a side view, FIG. 4 provides an end planar view and FIG. 5 provides a side cross sectional view through the plane A-A shown in FIG. 4.

Walls of the sensor cap 70 in this example are rigid. The sensor cap 70 is hollow and allows for routing of wiring and connections between the ultrasonic transducer 2 and a signal source therethrough. Optionally, the walls of the sensor cap 70 are formed from a metal or metallic material such as steel. The rigidity and strong construction of the sensor cap 70 allows for beneficial transmission of the compressive force through to the ultrasonic transducer 2. The sensor cap 70 optionally comprises one or more flanges 95 or other locating mechanisms (see particularly FIG. 4) for locating in corresponding slots 97 in a casing 100 (shown in FIGS. 6 to 8). In this way, the transducer assembly 65 can be locked against rotation by the action of the flanges 95 or other locating mechanisms engaging in the slots 97. The sensor cap 70 optionally also comprises a flat distal end surface or other shaped surface so as to correspond with and/or provide a good engagement surface for engaging with an urging mechanism 105 or other mechanism for applying the compressive force.

The transducer assembly 65 comprises an electrical connector 75. The electrical connector makes an electrical connection between the backing material 60 and a wire 80 that extends through the hollow body of the sensor cap 70 to a connection for connection to the signal source. The electrical connector 75 is a rigid metal part, in this example in the form of a pin, but not limited to this. The use of a pin shaped electrical connector 75 with a large head allows a good contact to the backing material 60. The wire 80 is electrically connected, e.g. bonded, to the electrical connector 75, which could be by an electrically conductive bond, such as a silver adhesive, but any suitable electrically conductive bonding or connection process could be used. In this way, the wire 80, electrical connector 75, backing material 60 and active electrode 25 form a part of the electrical circuit from the active electrode 25 to a connection for the signal source.

The transducer assembly 65 also comprises a wire 85 electrically bonded or otherwise connected to the housing 30 (or alternatively to the substrate 40 of the piezoelectric element 10) and extending through the hollow body of the sensor cap 70. In this way, the substrate 40 acting as the counter (e.g. ground) electrode 45, optionally the housing 30 and the wire 85 form a part of the electrical circuit from the signal source to the counter electrode 45. Beneficially, the wire 85 can optionally be provided with a spring, wave or other accommodating configuration proximate the end that connects to the housing 30 to accommodate compression of the ultrasonic transducer 2. In examples, the wires 80, 85 can be formed from metallic wire, such as nickel wire. The wires 80, 85 in examples have a diameter of 1 mm or less, e.g. 0.5 mm wire.

The hollow body of the sensor cap is filled with an electrically insulating material 87 that extends between the wire 80 for the active electrode 25 and the wire 85 for the counter electrode so as to electrically insulate the wire 80 from the wire 85. Preferably but not essentially, the insulating material 87 is rigid and provides a rigid backing to facilitate application of the compressive force. An exemplary insulating material 87 is an electrically insulating ceramic, such as a cast ceramic.

The ultrasonic transducer 2 is bonded or otherwise fixed to the cap 70 and/or the insulating material 87. In examples, the ultrasonic transducer is bonded to the insulating material 87 and/or cap 70 by a bonding material 90 such as a ceramic material, but is not limited to this.

Figure 6:
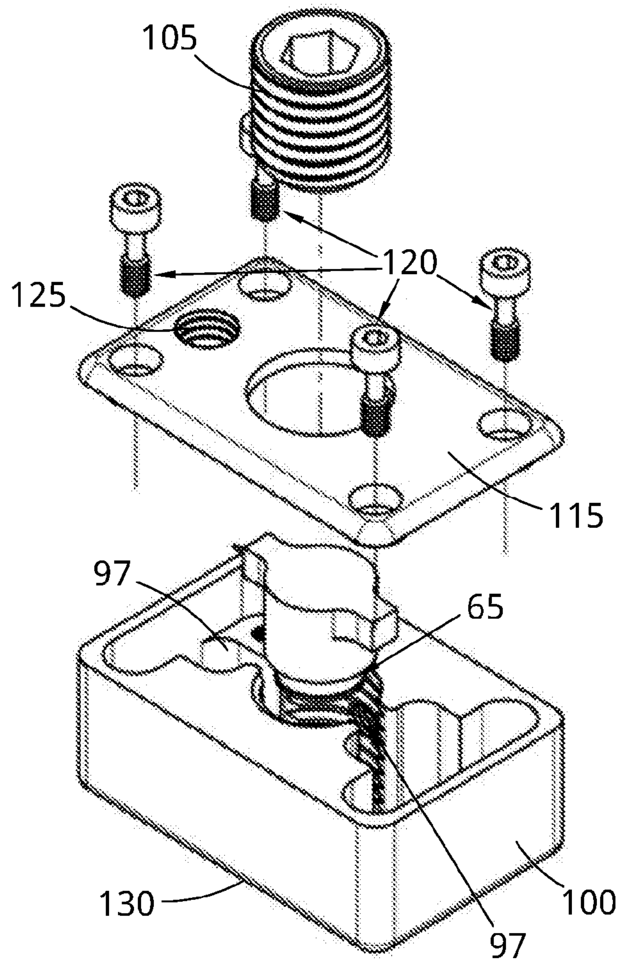
FIG. 6 shows an exploded view of part of an ultrasonic sensor.
Figure 7:
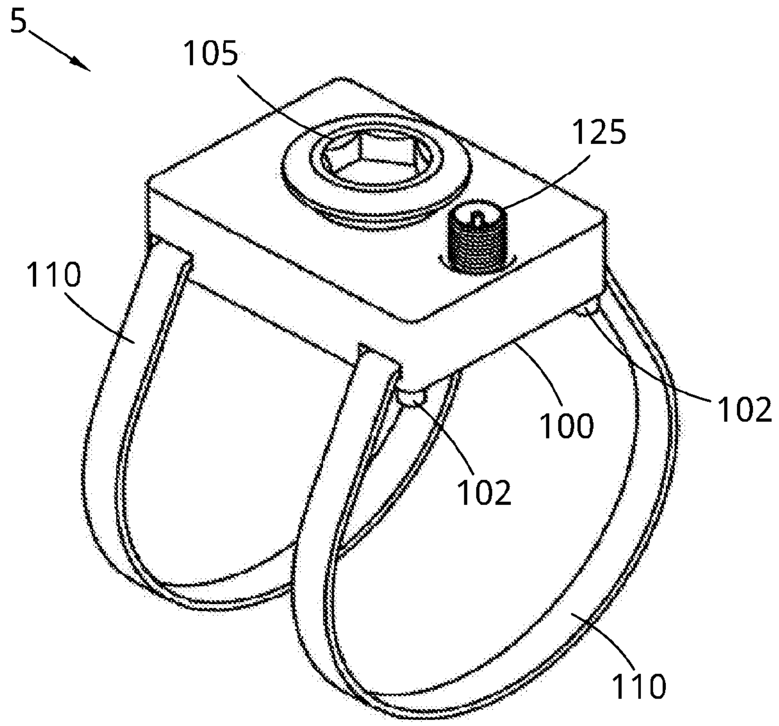
FIG. 7 is a perspective view of the ultrasonic sensor.
Figure 8:
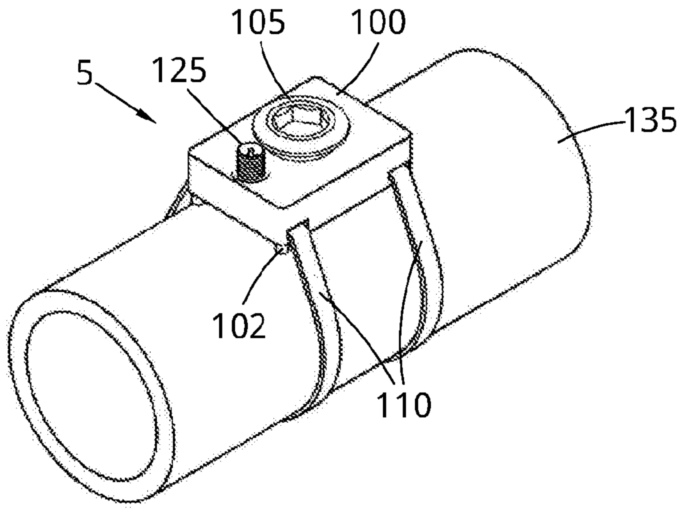
FIG. 8 is a perspective view of the ultrasonic sensor of FIG. 7 mounted to an entity.

As shown in FIG. 6 to 8, the ultrasonic sensor 5 comprises a hollow casing 100 with the transducer assembly 65, including the ultrasonic transducer 2, fitted into the casing 100. The ultrasonic sensor 5 further comprises a mount 110 that is attached or attachable to the casing 100 and arranged for attaching the ultrasonic transducer 5 to the entity to be sensed/tested. In this example, the mount 110 comprises a pair of bands that can loop around the entity and be secured in place using a securing mechanism in order to clamp the ultrasonic sensor 5 to the entity. This arrangement is particularly suited to mounting to pipes, conduits and cylinders but other mounts adapted for mounting to different types of entity could be used. The casing 100 is beneficially provided with a plurality of standoffs 102 for spacing the rest of the casing 100 from the entity to be sensed, in use.

The casing 100 defines a hollow box comprising a lid 115 and is generally rigidly constructed, e.g. from steel. The lid 115 can be fixed in place with bolts 120. The interior of the casing 100 is configured to receive the transducer assembly 65 therein. The casing 100 defines the slots 97 that receive the flanges 95 of the transducer assembly 65 to prevent rotation of the transducer assembly 65 in use. The lid 115 can then be bolted onto the casing 100 using the bolts 120 to close the transducer assembly 65 in the interior of the casing 100. The casing 100 optionally comprises an opening to allow at least part of the ultrasonic transducer 2 to protrude or face externally from the casing 100 so as to be able to engage with the entity to be sensed/tested.

The lid 115 (or alternatively optionally the casing 100) defines an opening for an electrical connection 125 for attaching the signal source. Respective appropriate parts of the electrical connection 125 are connected to the wire 80 that is electrically connected to the active electrode and the wire 85 that is electrically connected to the counter electrode.

The lid 115 (or alternatively the casing 100) also defines an opening 130 to allow the urging mechanism 105 to be inserted. The opening 130 in this example is screw threaded and the urging mechanism 105 is a bolt or other screw type member, but other types of urging mechanism 105 for selectively applying and removing the compressive force on the transducer assembly 65, and thereby the ultrasonic transducer 2, could be used, e.g. a plunger, actuator, piston, or the like.

In this example, the ultrasonic sensor 5 can be fixed to the entity to be sensed/tested using the mount 110, e.g. by passing the bands round the entity and securing them in place using the securing mechanism (not shown), such as a worm screw, ratchet, clasp or clamp, pin and hole arrangement, or the like. The urging mechanism 105 can then be selectively operated to compress the ultrasonic transducer 2 against the entity. In this particular example, the urging mechanism 105 is screwed into the casing 100 so as to bear against an end of the sensor cap 70 to apply the compression force through the sensor cap 70 to the ultrasonic transducer 2 to compress the ultrasonic transducer 2 onto the entity. The urging mechanism 105 is configured to bear down on the sensor cap 70, which in turn causes the sensor cap 70 and the insulating material 85 to bear down on the ultrasonic transducer 2 to compress the ultrasonic transducer 2 between the entity and the sensor cap 70/insulating material 85. When this compressive force goes above a threshold, e.g. which could be in a range from 10 to 100 MPa for example, the frangible component 50 fragments and the compressive force further urges the active electrode 25 to close the gap 20 so as to contact the layer of piezoelectric material 35 and complete the electric circuit between the piezoelectric element 10, via the active electrode, wire 80 and the electrical connection 125 to the signal source. As such, any electrical signals applied by the signal source will be conveyed via the active electrode through the layer of piezoelectric material 35 to the counter electrode so as to cause the piezoelectric element 10 to emit ultrasonic waves into the entity.

Figure 9:
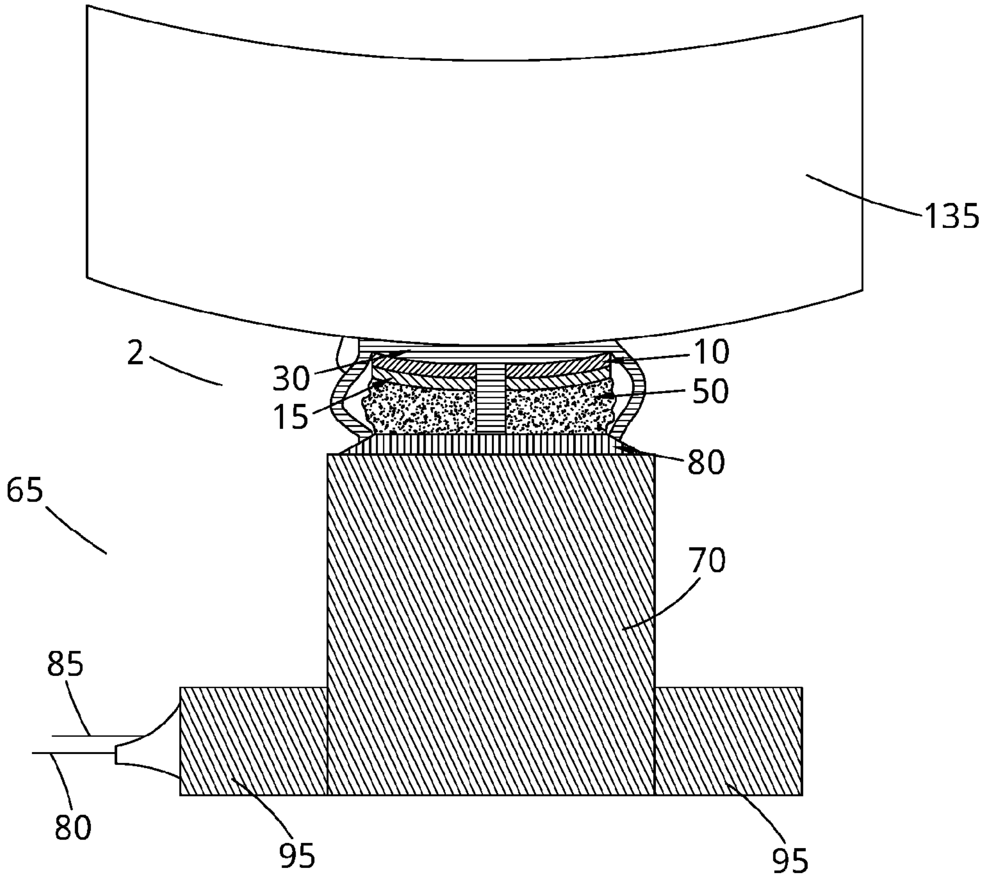
FIG. 9 is a side view of the transducer assembly shown in FIGS. 3 to 5 when mounted to the entity shown in FIG. 8.

A simplified side profile view of the ultrasonic transducer 2 when applied to the entity under the compression force applied by the urging mechanism 105 is shown in FIG. 9. In FIG. 9, the casing 100 and mount 110 have been removed from the drawing for simplification but would be present in reality.

It can be seen from FIG. 9 that the compressive force acts to fragment the frangible component 50 and optionally deform the housing 30. Under the action of the compressive force applied by the urging mechanism 105, the active electrode 25 is pushed into contact with the layer of piezoelectric material 35 of the piezoelectric element 10 to close the gap 20 so as to close the circuit between the electrical connection 125 to the signal source and the piezoelectric element 10. Thereby, the piezoelectric element 10 is operable to emit ultrasound into the entity responsive to electrical signals from the signal source.

Conversely, the urging mechanism 105 can be selectively operated to release the compression force on the ultrasonic transducer, e.g. by unscrewing the urging mechanism 105 in the particular example shown. It will be appreciated that the compressive force would also be released by releasing the mount 110, e.g. loosening or releasing the bands from around the entity. Importantly, in this case, the frangible component 50 has been fragmented. As such, neither the compressive force nor the frangible component 50 are operable to hold the active electrode 25, aperture former 15 and piezoelectric element 10 in place and the gap 20 re-opens. In this state, it is difficult to reform a good level of electrical connection between the active electrode 25, housing 30 and piezoelectric element 10, even if the compressive force is re-applied.

In this way, the ultrasonic transducer 2 is effectively operable once and so provides a degree of assurance that any reading are legitimate. If the ultrasonic sensor 5 is removed, then the ultrasonic signal stops as the circuit is broken. The total cessation of ultrasonic signal provides an indication that the ultrasonic sensor 5 has been removed. Furthermore, the ultrasonic sensor 5 transducer 2 is optionally rendered inoperable or at least with significantly degraded operation thereby making it difficult or impossible to simply replace the ultrasonic sensor 5 and try to re-apply the compressive force. This results in a sensor that affords increased confidence that any sensor readings are genuine and are not erroneous due to moving or removal of the sensor, and that any moving or removal of the sensor can be identified. Beneficially, in examples where the ultrasonic transducer 2 is a single use component, only the ultrasonic transducer 2 or the transducer assembly 65 need be replaced, and the casing 100 and mount 110 can be re-used.

Figure 10:
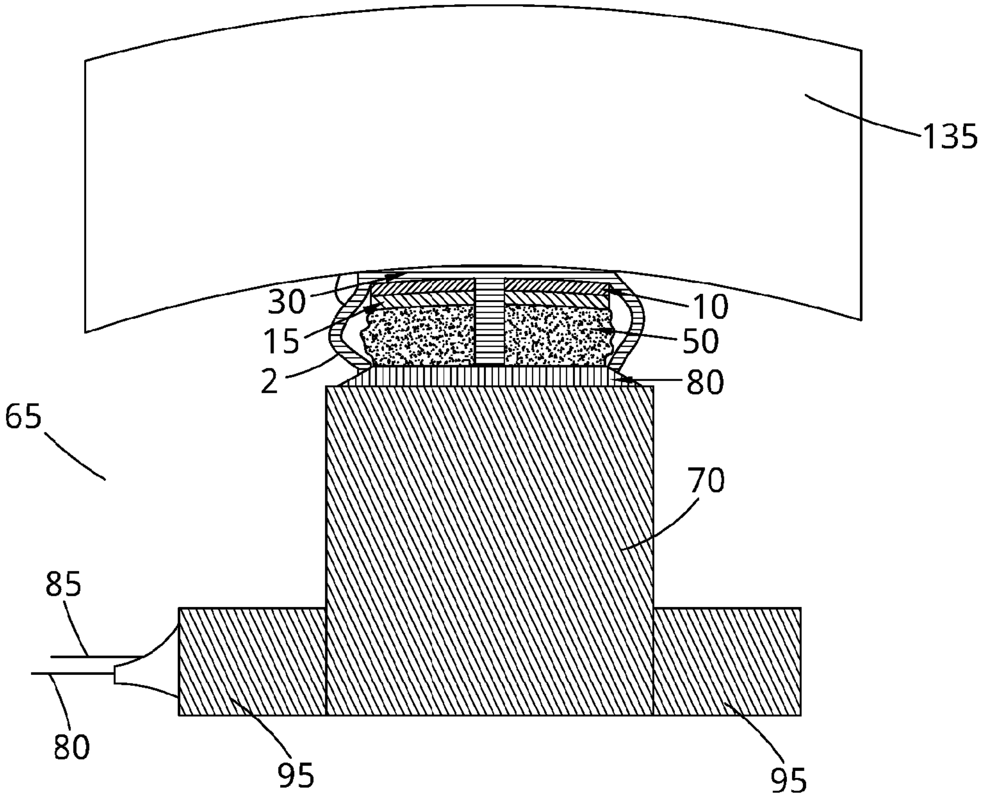
FIG. 10 is a side view of the transducer assembly shown in FIGS. 3 to 5 when mounted to a different entity.

An alternative arrangement illustrating the flexibility and conformability of the present arrangement is shown in FIG. 10, which is similar to FIG. 9, with the same ultrasonic transducer assembly 65 as shown in, and described in relation to, FIGS. 3 to 9 but with a concave entity profile (e.g. an inner surface of a pipe) rather than the convex profile shown in FIGS. 8 and 9. The application of the compressive force using the urging mechanism 105 still results in fragmenting of the frangible component 50 by compressing the ultrasonic transducer 2 between the entity and the sensor cap 70 and insulating material 85. As in the above examples, release of the compressive force, e.g. by unscrewing the urging mechanism 105 and/or by releasing the mount 110, e.g. the bands, causes the ultrasonic transducer 2 to stop operating by breaking the circuit 145 and becoming inoperable, as the components are no longer held by either the frangible component 50 or the compressive force and so are caused to, or at least free to, move into inoperable configurations.

Figure 11:
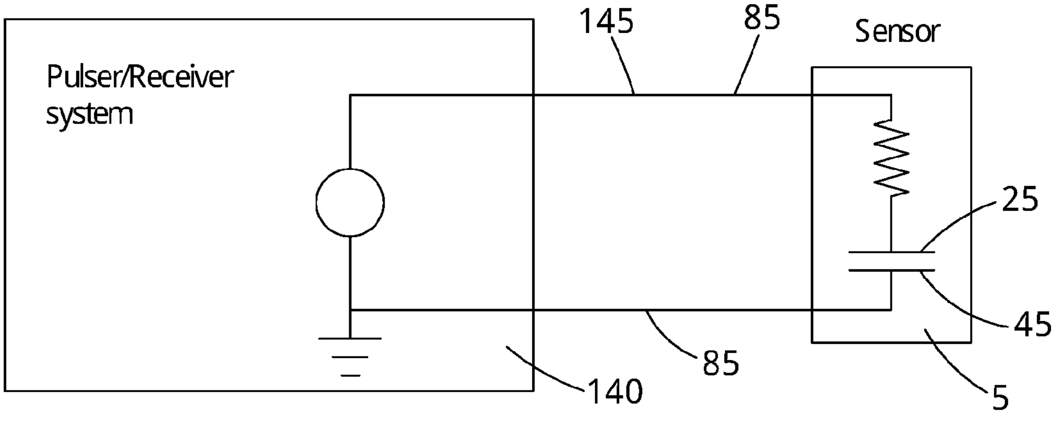
FIG. 11 is a diagrammatic view of an electrical circuit comprising the ultrasonic sensor of FIG. 7.

FIG. 11 shows a circuit diagram of the ultrasonic sensor 5 connected to the signal source 140, e.g. via the electrical connection 125, when the ultrasonic transducer 2 is in an operable configuration, i.e. under a compressive force to that the air gap 20 is closed by the active electrode 25 to complete the circuit 145. The signal source 140 is operable to provide an alternating current at a desired frequency to the electrical connection 125. The signal is then communicated via wire 80 to the electrical connector 75 and thereby to the electrically conductive backing material 60 to the active electrode 25 which is in contact with the layer of piezoelectric material 35 of the piezoelectric element 10. The circuit 145 is completed by the electrically conductive substrate 40 acting as the counter electrode 45 to the housing 30, and thereby via the wire 85 to the electrical connection 125 back to the signal source 140 to complete the circuit 145.

Figure 12:
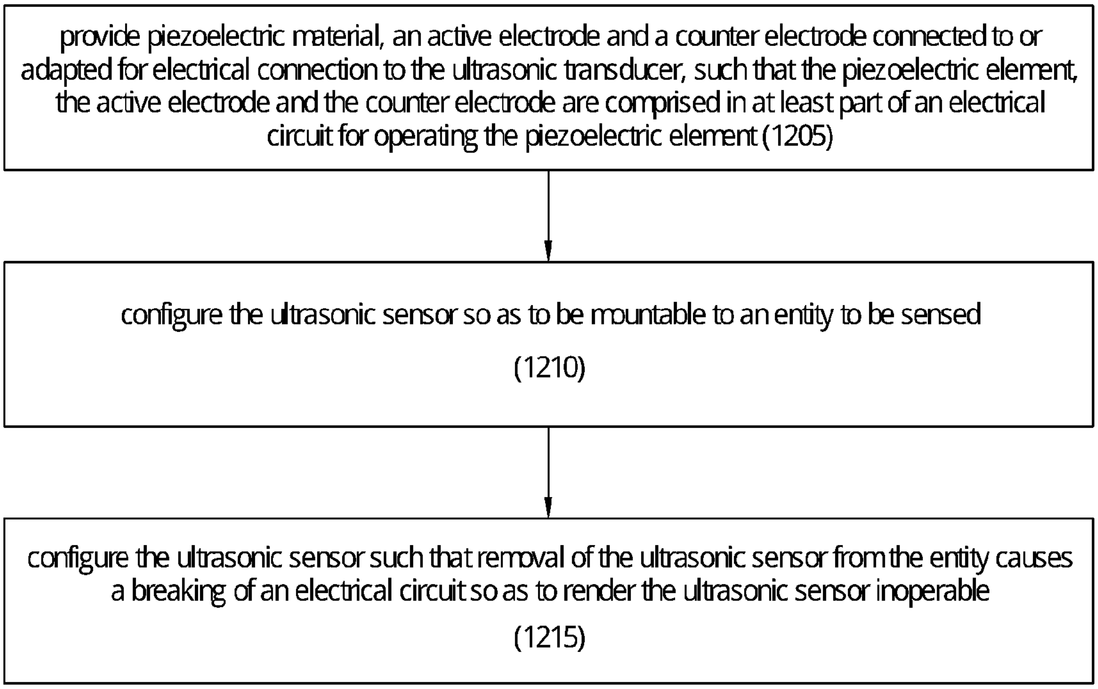
FIG. 12 is a flowchart illustrating a method of producing the ultrasonic transducer of FIG. 1.

FIG. 12 shows a method of constructing the ultrasonic sensor 5 described above. The method comprises providing the piezoelectric element 10, and the active electrode 25 and counter electrode 45 connected or adapted for electrical connection to the piezoelectric element 10 in step 1205. The piezoelectric element 10, the active electrode 25 and the counter electrode 45 are arranged so that they are comprised in at least part of the electrical circuit 145 for operating the piezoelectric element 10. In step 1210, the ultrasonic sensor 5 is configured to be mountable to an entity 135 to be sensed. In step 1215, the ultrasonic sensor 5 is configured such that removal of the ultrasonic sensor 5 from the entity 135 causes a breaking of the electrical circuit 145 so as to render the ultrasonic sensor inoperable, e.g. irreversibly inoperable.

Figure 13:
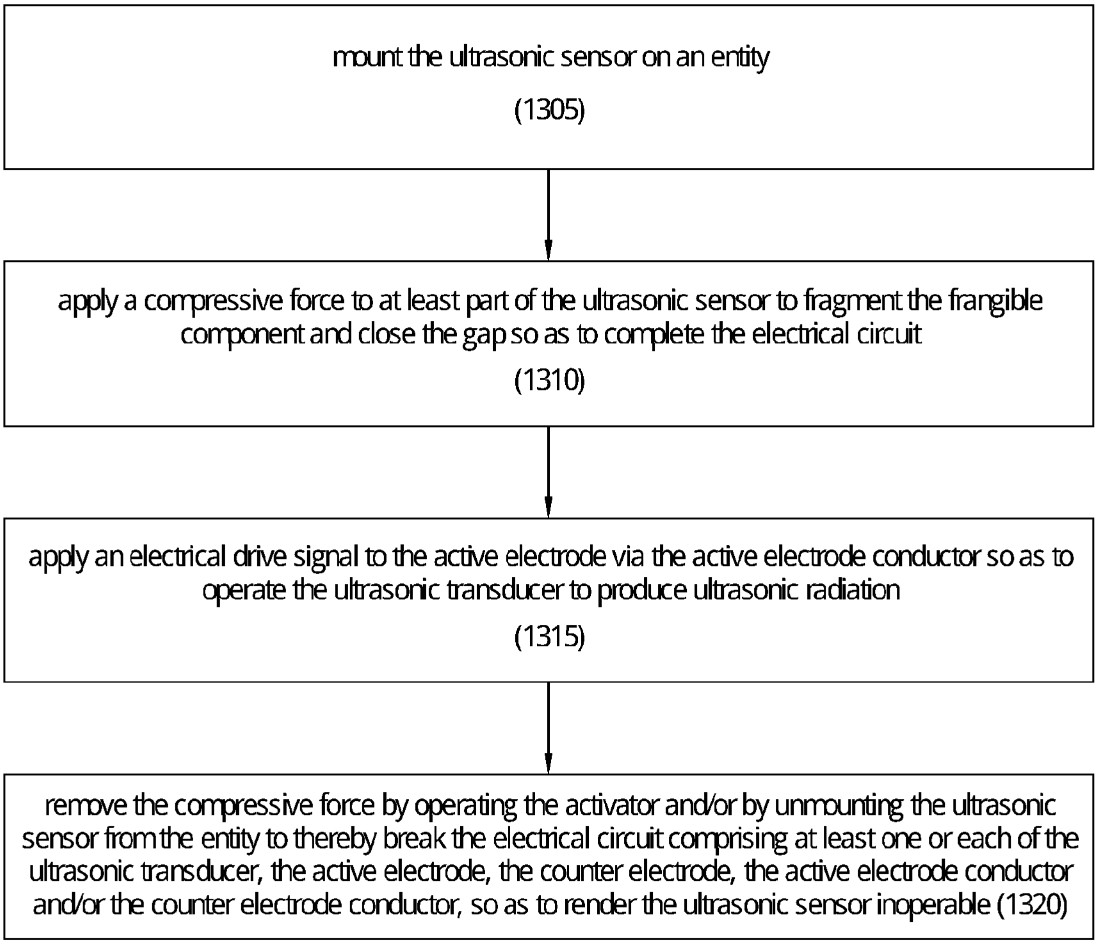
FIG. 13 is a flowchart illustrating a method of operating the ultrasonic sensor of FIGS. 6 to 8.

FIG. 13 shows a method of using the ultrasonic sensor 5 described above. In step 1305, the ultrasonic sensor 5 is mounted on the entity 135. In step 1310, a compressive force is applied to at least part of the ultrasonic sensor 5, e.g. by operating the urging mechanism 105. This fragments the frangible component 50 and causes the air gap 20 to be closed to complete the electrical circuit 145. In step 1315, an electrical drive signal is applied to the active electrode 25 via the active electrode conductor 80 so as to operate the ultrasonic transducer 2 to produce ultrasonic radiation, e.g. to emit ultrasonic waves into the entity 135. In step 1320, the compressive force is removed, e.g. by operating the urging mechanism 105 and/or by unmounting the ultrasonic sensor 5 from the entity 135, to thereby break the electrical circuit 145 so as to render the ultrasonic sensor inoperable, e.g. irreversibly inoperable.

The following provides some alternative description of the drawings.

FIG. 1 is a cross section of a possible disposable ultrasound sensor stack design. Part 30 comprises an optional wear face, which may be, but is not limited to, 50 μm thick aluminium, steel, titanium, or brass. Part 10 shows the piezoelectric material, which may be, but is not limited to, a thin-film such as ZnO deposited on aluminium, steel, titanium or brass. Thicknesses vary depending on the desired frequency applications. If part 30 is not included, then part 10 may be cut to the shape of part 30 for stack assembly. Part 15 is an optional aperture former, which may comprise of a polymer or similar dielectric. Part 20 shows an air gap which is removed once the sensor has been compressed. Part 25 is the live or active electrode, which may comprise of 50 μm thick aluminium, steel, titanium or brass. Part 50 is an electrically insulating, frangible layer, which may be, but is not limited to, soft cured frangible ceramic, or silicone rubber. Part 60 is a conformable, electrically conductive backing material, which may be, but is not limited to graphite, re-enforced graphite, or other graphite-based materials. The sensor stack may comprise a single element, dual elements, or a plurality of elements.

Figure 2:
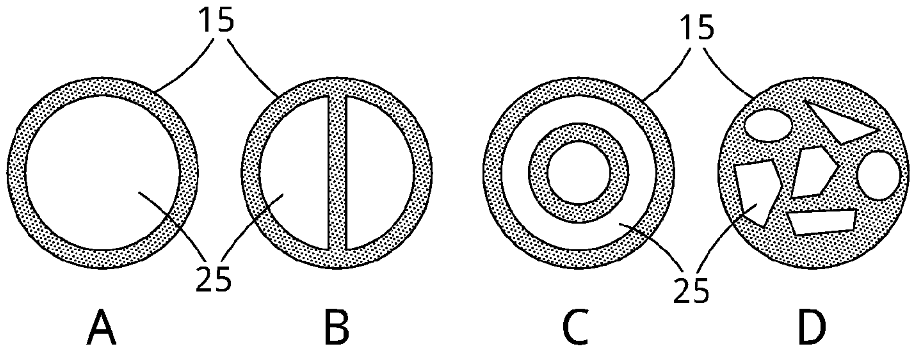
FIG. 2A to 2D show planar views of exemplary ultrasonic transducer configurations.

FIG. 2 shows a set of different possible electrode patterns that could be utilised, it should be noted that these examples do not form an exhaustive list. From left to right this comprises of, a single element electrode, dual element electrodes, annular dual element electrodes, and a set of arbitrary element electrodes. All other diagrams show examples with just the single element electrode design; however, the concept can be extended to any of these designs.

FIG. 5 shows a cross section of a potential assembled single element sensor, comprising of a sensor stack, as shown in FIG. 1, and a sensor 'cap', part 70. Electrically conductive bonding points are provided, and may be, but are not limited to, silver based conductive adhesive. Parts 80 and 85 are the electrically conductive components providing a live and ground connection to the sensor, these may be, but are not limited to, 0.5 mm diameter nickel wiring. The end of the ground wire may be made with a spring shaped end part to facilitate compressibility. Part 90 bonds the sensor stack to the sensor cap, and may be, but is not limited to, ceramic. Part 75 is a ridged, conductive component that provides an electrical connection to the conformable backing layer (part 60), this may be, but is not limited to, a steel pin. Part 87 is electrical insulation and provides a ridged backing for compression, this may be, but is not limited to, cast ceramic. Part 70 is a rigid housing to provide a robust surface on which compression may be applied for installation, this may be, but is not limited metals such as steel, and may comprise of a 'T' shape to prevent rotation on installation into a fixture. This shape is made clearer by the top view shown in FIG. 4, right. An electrical insulator is provided to prevent shorts to the live wire, this may be ceramic tubing.

FIGS. 3 and 4 comprise the same parts as FIG. 5 but shows the sensor from the side and from below instead of a cross section. The dotted line in the top view shows the location of the cross-section shown in FIG. 4. FIGS. 9 and 10 show the assembled sensor being compressed to two different shaped inspections samples, indicated by parts 135. Parts 10, 15, 25, 30, 35, 40, and 45 have conformed to the shape of the inspection sample, while part 50 has cracked. The other parts all remain rigid.

FIG. 6 shows a 3D exploded view of how a sensor could be inserted into a fixture, parts 100, 115 which could be made of steel. The fixture itself is covered by prior art GB2582562A. Part 100 is the fixture body, part 115 is the fixture lid, part 120 is a set of screws securing the lid to the body, and part 105 is a screw by which compression could be applied to the sensor to facilitate installation.

FIG. 11 shows a basic circuit diagram of how a sensor can be driven using a pulser/receiver system, and the subsequent ultrasound signals returned. For multi-element sensors this can comprise of multiplex wiring to provide individual connections to each element.

The invention claimed is:

1. An ultrasonic sensor comprising an ultrasonic transducer, the ultrasonic transducer comprising:
- a piezoelectric element;
- an active electrode and a counter electrode adapted for electrical connection to the piezoelectric element; and
- an urging mechanism configured to selectively apply and/or release a compressive force on at least part of the ultrasonic transducer, wherein
  - the piezoelectric element, the active electrode and the counter electrode are comprised in at least part of an electrical circuit for operating the piezoelectric element;
  - the ultrasonic sensor is mounted or configured to be mountable to an entity to be sensed;
  - the ultrasonic sensor is adapted such that removal of the ultrasonic sensor from the entity causes a breaking of the electrical circuit so as to render the ultrasonic sensor inoperable or irreversibly inoperable;
  - the ultrasonic transducer comprises at least one frangible component configured to fragment responsive to the compressive force the on at least part of the ultrasonic sensor; and
  - the ultrasonic transducer is configured such that a combination of the frangible component being fragmented and the release of the compressive force causes or results in the circuit being broken so as to render the ultrasonic sensor inoperable or irreversibly inoperable.

2. The ultrasonic sensor of claim 1, configured such that removal of the ultrasonic sensor from the entity releases the compressive force.

3. The ultrasonic device according to claim 1, wherein the frangible component is a ceramic component.

4. The ultrasonic device according to claim 1, further comprising an active electrode conductor and a counter electrode conductor adapted for electrical conduction with the active electrode and counter electrode respectively, the active electrode conductor and counter electrode conductor being comprised in at last part of the electrical circuit.

5. The ultrasonic device of claim 1, wherein the frangible component is a separate component to at least one or each of: the piezoelectric element, the active electrode, the counter electrode, the active electrode conductor and/or the counter electrode conductor.

6. The ultrasonic device of claim 1, wherein the frangible component is configured such that, when in an unfragmented state, the frangible component acts on at least one or each of: the piezoelectric element, the active electrode, the counter electrode, the active electrode conductor and/or the counter electrode conductor to put it into a condition where it forms at least part of the electrical circuit or can be utilized to form at least part of the electrical circuit, but when the frangible component is fragmented, the frangible component releases at least one or each of: the piezoelectric element, the active electrode, the counter electrode, the active electrode conductor and/or the counter electrode conductor so that it is free to move or caused to move into a configuration where the circuit is broken and/or the ultrasonic sensor is inoperable or permanently inoperable.

7. The ultrasonic device according to claim 1, wherein the urging mechanism is configured to maintain the compressive force once applied until it is selectively released.

8. The ultrasonic device according to claim 7, wherein the urging mechanism, is operable to selectively urge the ultrasonic transducer toward the entity, in use.

9. The ultrasonic device according to claim 1, wherein the urging mechanism comprises a screw threaded member that is screwable into a housing of the ultrasonic sensor so as to selectively apply the compressive force and is screwable out of the housing so as to release the compressive force.

10. The ultrasonic device according to claim 1 comprising a mount for mounting the ultrasonic sensor to the entity.

11. The ultrasonic device according to claim 1, wherein the ultrasonic device is configured to operate with the compressive force in the range from 10 to 100 MPa.

12. The ultrasonic device according to claim 1, comprising backing material provided between the urging mechanism and/or the mount and at least one or each of: the piezoelectric element, the active electrode, the counter electrode, the active electrode conductor, the counter electrode conductor, and/or the frangible component, the backing material being electrically conductive.

13. The ultrasonic device of claim 12, wherein the backing material comprises graphite, re-enforced graphite, or other graphite-based materials.

14. The ultrasonic device according to claim 1, configured to brought into an operative state by the application of the compressive force.

15. The ultrasonic device according to claim 14, wherein, in an initial state, the electrical circuit is broken by at least one part of the electrical circuit being spaced apart from at least one other part of the electrical circuit by an air gap configured such that application of the compressive force closes the gap to thereby close or complete the circuit.

16. The ultrasonic device of claim 1, wherein the ultrasonic transducer is configured such that the at least one or each of: the piezoelectric element, the active electrode, the counter electrode, the active electrode conductor and/or the counter electrode conductor is configured to move or be movable out of the configuration in which the circuit is closable when the frangible component is fragmented and the compressive force released.

17. The ultrasonic device according to claim 1, wherein the ultrasonic transducer is flexible and conformable.

18. A method of constructing the ultrasonic sensor of claim 1, the method comprising:

providing a piezoelectric element and providing an active electrode and a counter electrode connected or adapted for electrical connection to the piezoelectric element;

arranging the piezoelectric element, the active electrode and the counter electrode so that they are comprised in at least part of an electrical circuit for operating the piezoelectric element;

configuring the ultrasonic sensor to be mountable to an entity to be sensed; and configuring the ultrasonic sensor such that removal of the ultrasonic sensor from the entity causes a breaking of the electrical circuit so as to render the ultrasonic sensor inoperable or irreversibly inoperable, wherein the ultrasonic sensor comprises an urging mechanism configured to selectively apply and/or release a compressive force on at least part of the ultrasonic sensor;

the ultrasonic sensor comprises at least one frangible component configured to fragment responsive to the compressive force on the at least a part of the ultrasonic sensor; and the ultrasonic sensor is further configured such that a combination of the frangible component being fragmented and the release of the compressive force causes or results in the circuit being broken so as to render the ultrasonic sensor inoperable or irreversibly inoperable.

19. A method of using the ultrasonic sensor of claim 1, the method comprising:

mounting the ultrasonic sensor on an entity;

applying a compressive force to at least part of the ultrasonic sensor so as to close the circuit and fragment the frangible component by applying the compressive force;

applying an electrical drive signal to the active electrode via the active electrode conductor so as to operate the ultrasonic transducer to produce ultrasonic radiation; and removing the compressive force to thereby break the electrical circuit so as to render the ultrasonic sensor inoperable, wherein the compressive force is selectively applied and/or removed using the urging mechanism.

20. The ultrasonic device of claim 1 wherein the ultrasonic transducer is configured such that removal of the ultrasonic sensor from the entity causes at least one of the piezoelectric element, the active electrode, and the counter electrode to move out of the configuration in which the circuit is closable.

* * * * *